N. KING,
Assignor, by mesne assignments, to WINCHESTER REPEATING ARMS CO.
Magazine Fire-Arms.
No. 9,157. Reissued April 13, 1880.
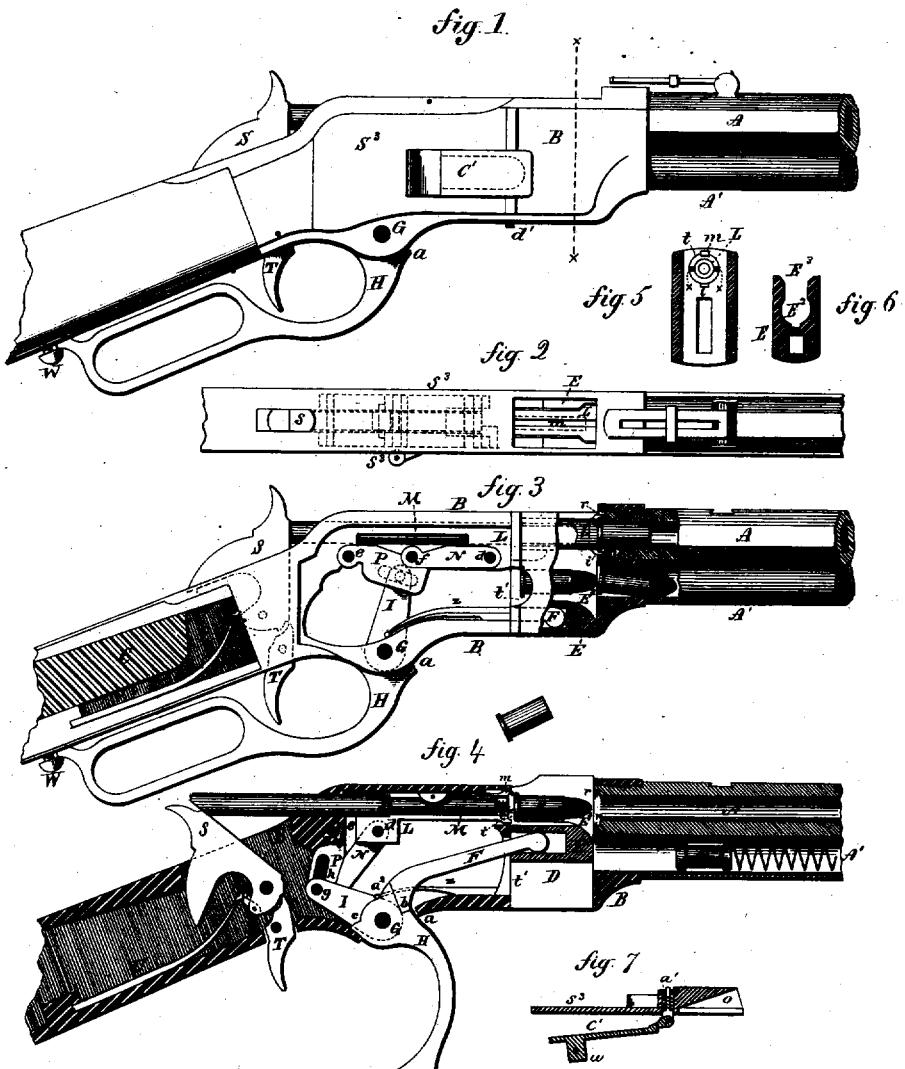
Winchester Repeating Arms Co
per Nelson King.
Inventor.
By atty.
Wm. C. Earle
Witnesses:
J. H. Shumway
Jos. C. Earle
N. PETERS, PHOTO-LITHOGRAPHER, WASHINGTON, D. C.

UNITED STATES PATENT OFFICE.

WINCHESTER REPEATING ARMS COMPANY, OF NEW HAVEN, CONNECTICUT, ASSIGNEE, BY MESNE ASSIGNMENTS, OF NELSON KING.

MAGAZINE FIRE-ARM.

SPECIFICATION forming part of Reissued Letters Patent No. 9,157, dated April 13, 1880.

Original No. 55,012, dated May 22, 1866. Application for reissue filed January 14, 1880.

*To all whom it may concern:*

Be it known that NELSON KING, of Bridgeport, in the county of Fairfield and State of Connecticut, did invent a new Improvement in Magazine Fire-Arms; and I do hereby declare the following, when taken in connection with the accompanying drawings and the letters of reference marked thereon, to be a full, clear, and exact description of the same, and which said drawings constitute part of this specification, and represent the invention as applied to the arm patented to Smith and Wesson, February 14, 1850, embodying improvements for which a patent was granted to B. F. Henry, October 16, 1860.

Figure 1 is a side view; Fig. 2, a top view; Fig. 3, a sectional side view; Fig. 4, a longitudinal central section; Fig. 5, a section through the receiver on line *x x*, Fig. 1, looking to the rear; Fig. 6, a section of the carrier on the same line, and Fig. 7 a detached view of one side of the receiver.

This invention relates to an improvement in that class of repeating fire-arms in which several metallic cartridges are placed in a tube or magazine beneath the barrel of the arm and carried therefrom to the barrel by the movement of the trigger-guard; and the invention consists in the construction, as hereinafter described, and particularly recited in the claims.

Before proceeding to describe the improvement, I will first describe the construction of the operative parts of the arm.

A is the barrel, of any known construction; B, the frame or receiver, to the forward end of which the barrel is secured and to the rear end a wooden stock, C.

In the frame or receiver B, and directly in the rear of the barrel, is formed a chamber or mortise, D, in which is placed a carrier, E, the office of which is to receive a cartridge from the magazine and raise it for insertion into the barrel, also to throw the discharged shell from the arm after it has been withdrawn from the barrel. The said carrier E is constructed with a chamber, $E^2$, (see Fig. 6,) to receive the cartridge from the magazine, and it is moved up within the chamber or mortise D, to present the cartridge to the barrel for insertion, and down when the cartridge has been removed from the carrier to the barrel by means of the lever F, one end of which lies within the carrier E, the other hung to the pivot G.

H is a lever serving both as a trigger-guard and as an instrument by which the several mechanical parts of the arm are made to operate. It is hung to the pivot G, upon which both the levers F and H may be freely turned. By turning the lever H from the position denoted in Fig. 3 to that denoted in Fig. 4, a shoulder, *a*, formed upon the lever H strikes a corresponding shoulder, *b*, upon the lever F, raising the said lever and carrier E, as denoted in Fig. 4. By returning the said lever H the upper arm, I, of the lever H strikes another shoulder, *c*, on the said lever F, and returns the lever F, with the carrier E, to the position denoted in Fig. 3.

L, the breech-piece, is hollow, of cylindrical form, through which passes a firing-pin, M. The rear end of the said breech-piece L is formed, as seen in Figs. 3 and 4, so as to attach upon either of its sides to a pivot, *d*, a link, N, of a toggle, as denoted in broken lines, Fig. 2. The other links, P, of the toggle are hinged to the frame by a pivot, *e*, and the two links hinged together at *f*. The upper arm, I, of the lever H extends up between the two toggles, and through the said arm I a pin, *g*, passes, extending out upon either side, so as to enter a slot or groove, *h*, upon the inside of the links P, and so that as the lever H is turned, as from the position in Fig. 3 to that in Fig. 4, the pin *g* will act to close the toggle and draw back the breech-piece L, which moves freely back and forth in the receiver B, as denoted in Fig. 4, and, by the return of the lever H, will extend the toggle and return the breech-piece L, as seen in Fig. 3. The raising of the carrier E, as before described, occurs after the breech-piece has been drawn back, and the breech-piece is returned before the return of the carrier, passing through the chamber $E^2$ in the carrier, for the purpose (as more fully hereinafter described) of removing the cartridge from the chamber $E^2$ in the carrier to the barrel. Therefore, in order to allow the carrier to return, it is necessary to cut a slot, $E^3$, from the chamber $E^2$ up through the carrier-block, as seen in Fig. 6. This slot must be narrower than the chamber, in order to prevent the accidental removal of the cartridge in the said chamber, as also to cause the raising of the carrier to eject the discharged and withdrawn shell; and that this narrow slot may pass down over the breech-piece, which is nearly the same diameter as the chamber in the carrier, the breech-piece is reduced upon its two sides, as seen in Figs. 2 and 3.

On the lower side of the breech-piece L a projecting lip, *i*, is formed, and upon the upper side is a spring-latch, *m*.

A cartridge, R, lying upon the carrier, as seen in Fig. 4, will, by the return of the breech-piece L, be forced into the rear of the barrel, the lip *i* entering a recess, *n*, below, and the latch *m*, rising and hooking over the flange of the cartridge, will enter a similar recess, *r*, above, as seen in Fig. 3, so that when the breech-piece is withdrawn the latch *m* will hold and withdraw the cartridge or discharged shell, as the case may be.

The firing-pin M is enlarged to form a shoulder, as denoted at *s*, at the rear of the breech-piece L, thence extends back through the receiver, and so as to slide freely therein, to the hammer S, and so that when the breech-piece is drawn back, as before described, the said firing-pin will force the hammer back to full-cock, as denoted in Fig 4, and on being returned to the position denoted in Fig. 3 will leave the hammer held at full-cock by the trigger T, which, when released in the usual manner, will, by the reaction of the spring U, fly back to the position denoted in Fig. 3, striking the end of the firing-pin M.

To the inner end of the firing-pin M a collar, *t*, is fixed, having projecting points *x* upon either side. (See Fig. 5.) The said collar *t* is of larger diameter than that part of the firing-pin M to which it is attached, and the recess made in the breech-piece to receive the said collar is made a little deeper than the thickness of the collar, so as to allow the firing-pin M, with the collar *t*, to move back, so that when the breech-piece L is forced up against the cartridge, as before described, the projecting points *x*, as they press against the cartridge, will force the firing-pin back, and then, when the hammer strikes the firing-pin M, as before described, the projecting points *x* will indent the metal of the cartridge sufficiently to explode the fulminate and ignite the powder within the cartridge.

A separate spring, *z*, for each of the levers F and H is secured upon the frame, the end of one of which bears upon the lever H, as seen in Fig. 3, to retain the lever in its home position, as in Figs. 1 and 3, the other upon the lever F, (see Fig. 4,) for the purposes more fully hereinafter described.

The lever H is held in its position against the frame or receiver by means of a thumb-screw, W, or an equivalent therefor. This completes the general construction of that part of the arm contained within the receiver. In the construction here shown the sides $S^3$ of the receiver are removable.

As heretofore constructed, the magazine or tube was fixed to the barrel and a slot cut through the entire length of the tube, through which a pin or projection from the follower within the tube extended, by means of which the follower was drawn up to near the muzzle end of the said tube, where the follower, with the spring and the upper portion of the tube, was turned to one side, so as to allow the cartridges to be inserted within the tube. Then the upper portion of the tube, with the follower and spring, was returned, so that the follower would again enter the tube and force the cartridge toward the rear or lower end of the tube into the carrier in like manner as hereinbefore described.

In this construction a great objection has existed from the fact that the open slot upon the under side of the tube would admit more or less dirt or other substances foreign and injurious to the proper working of the follower and spring within the magazine, and the necessary complication in the construction of the upper part of the magazine and barrel renders them very liable to get out of repair.

I will now proceed to describe the invention, whereby all serious objections to magazine-arms as heretofore constructed are overcome.

Beneath the barrel A is a thin metal tube, A′, extending along the barrel nearly its entire length, its rear end entering the receiver, so that when the carrier E is down, as in the position seen in Fig. 3, it will open directly into the chamber $E^2$ in the carrier-block. The said tube is secured to the barrel by means of bands or otherwise, and, if advisable, incase the lower portion of the tube with a wood stock. Within the tube is a follower, G′, and the upper end of the tube closed by a plug or otherwise, and between the follower and the plug is a helical spring, as seen in Fig. 4, the tendency of which is to force the follower toward the lower or rear end of the tube, as before described. Through outside of the receiver $S^3$, preferring the right-hand side, is an opening, as denoted by broken lines, Fig. 1, and also seen at *o* in section, Fig. 7. This opening *o* is formed so as to communicate through the receiver directly to the chamber $E^2$ in the carrier-block, as seen in Fig. 3. Through this opening, and while the carrier is down and all parts of the arm in a state at rest, insert the cartridges, point first, through the said opening *o* into the chamber $E^2$, the second cartridge pressing the first into the magazine, and so on each successive cartridge until the magazine is filled, or until the requisite number has been inserted therein, the follower G′ being pressed up before the entering cartridges. In the rear of the carrier a shoulder, *t′*, prevents the cartridges from being forced out through the passage by which they were introduced. The head of each successive cartridge, as it is inserted, passes over, then drops down in front of said shoulder, and so as to abut against that shoulder and support all the cartridges against the reacting force of the spring in the magazine.

C′ is a cover for closing the opening in the receiver. It is hinged, as seen in Figs. 1 and 7, the hinge provided with a spring, *a′*, the tendency of which is to open the cover C′. A spring-catch, *d′*, (see Fig. 1,) secures the cover when closed, so that by pressing upon the said catch the cover will fly open.

On the inside of the cover is a stud or projection, *w*, the front face of which lies close in rear of the last cartridge, and so as to serve as a stop to arrest the rear movement of the column of cartridges so soon as such rear movement has placed the rearmost cartridge on the carrier to take the place of the one last transferred to the barrel.

After the requisite number of cartridges have been placed within the magazine, close the cover, as seen in Figs. 1 and 2. One cartridge remains in the carrier, from which position (see Fig. 3) it will be carried up to the position in Fig. 4, substantially in line with the barrel, and inserted into the barrel, and the carrier returned to receive a second cartridge, as before described. When the first cartridge has been discharged, as in Fig. 3, withdraw the shell, as before described. The latch *m* upon the breech-piece will hold the discharged shell until the carrier is nearly up to its full height, when the spring Z will fall into a notch, $a^2$, on the lever, giving a sudden movement to the carrier, which will eject the discharged shell entirely from the arm, as denoted in Fig. 4, and thus the operation of firing may be continued until all the cartridges within the magazine have been each in their turn discharged.

By this arrangement the objections existing in the arm as originally constructed, and before mentioned, are entirely overcome, and because of the arrangement of the charging-opening in the receiver in such relation to the magazine-carrier and breech-piece that the magazine may be filled through said opening, the breech-piece is closed and all the operative parts in their place of rest.

This arm is peculiarly adapted for cavalry uses, as, when suspended from the neck of the cavalryman and hanging at his side, he may with his one hand only charge his arm, even under the most difficult circumstances, or when lying across the bridle-arm the same advantages for charging are presented.

What is claimed as the invention of the said NELSON KING is—

1. In a magazine fire-arm, the combination of a breech-piece arranged to open and close the rear end of the barrel, and a carrier to transfer the cartridges from the magazine to a position substantially in line with the barrel, with the receiver, constructed with an opening leading to the magazine, through which the magazine may be filled while the breech-piece is in its closed position, substantially as described.

2. In a magazine fire-arm, the combination of a breech-piece arranged to open and close the rear end of the barrel, and a carrier to transfer the cartridge from the magazine to a position substantially in line with the barrel, with the receiver, constructed with an opening leading to the magazine, through which the magazine may be filled while the breech-piece is in its closed position, and a stop over which each cartridge will pass on its way to the magazine, and against which they will successively abut, to prevent the magazine-spring from forcing them out through the passage by which they were introduced, substantially as described.

3. In a magazine fire-arm, the combination of a breech-piece arranged to open and close the rear end of the barrel, and a carrier to transfer the cartridges from the magazine to a position substantially in line with the barrel, with the receiver, constructed with an opening leading to the magazine, through which the magazine may be filled while the breech-piece is in its closed position, and a cover to close said opening, substantially as described.

4. In a magazine fire-arm, the combination of a breech-piece arranged to open and close the rear end of the barrel, and a carrier to transfer the cartridges from the magazine to a position substantially in line with the barrel, with the receiver, constructed with an opening leading to the magazine, through which the magazine may be filled while the breech-piece is in its closed position, and a cover to close said opening, provided with a stop to arrest the rear movement of the cartridges from the magazine when the rearmost cartridge has reached its position for transfer, substantially as described.

WINCHESTER REPEATING ARMS CO.,
By THOMAS G. BENNETT, *Secretary,*
*Assignee of Nelson King, inventor.*

Witnesses:
JOHN E. EARLE,
W. T. HUTCHINSON,
W. W. WINCHESTER,
WM. W. CONVERSE.